United States Patent
Ohta et al.

(10) Patent No.: US 9,423,968 B2
(45) Date of Patent: Aug. 23, 2016

(54) USING HOST TRANSFER RATES TO SELECT A RECORDING MEDIUM TRANSFER RATE FOR TRANSFERRING DATA TO A RECORDING MEDIUM

(71) Applicant: International Business Machines Corporation, Armonk, NY (US)

(72) Inventors: Yumiko Ohta, Kanagawa (JP); Yutaka Oishi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/675,621

(22) Filed: Mar. 31, 2015

(65) Prior Publication Data
US 2015/0205536 A1    Jul. 23, 2015

Related U.S. Application Data

(63) Continuation of application No. 13/660,951, filed on Oct. 25, 2012, now Pat. No. 9,043,508.

(30) Foreign Application Priority Data

Oct. 27, 2011    (JP) .................................. 2011-235707

(51) Int. Cl.
G06F 3/06        (2006.01)
G11B 5/008       (2006.01)
G11B 20/10       (2006.01)

(52) U.S. Cl.
CPC ............ *G06F 3/0613* (2013.01); *G06F 3/0656* (2013.01); *G06F 3/0682* (2013.01); *G11B 5/00813* (2013.01); *G06F 3/061* (2013.01); *G06F 3/0674* (2013.01); *G11B 2020/1062* (2013.01); *G11B 2020/10814* (2013.01); *G11B 2220/90* (2013.01)

(58) Field of Classification Search
None
See application file for complete search history.

(56) References Cited

U.S. PATENT DOCUMENTS

| 8,035,912 | B2  | 10/2011 | Katagiri et al. |
| 8,693,129 | B2  | 4/2014  | Katagiri et al. |
| 2002/0060961 | A1* | 5/2002 | Yamamoto ................. 369/47.11 |

(Continued)

FOREIGN PATENT DOCUMENTS

| JP | 06202814 | 7/1994 |
| JP | 2006318571 | 11/2006 |

(Continued)

OTHER PUBLICATIONS

Document entitled "Information Materials for IDS", Oct. 3, 2011.

(Continued)

*Primary Examiner* — Ilwoo Park
(74) *Attorney, Agent, or Firm* — David W. Victor; Konrad Raynes Davd & Victor LLP

(57) ABSTRACT

Provided are a storage device, controller, and method for using host transfer rates to select a recording medium transfer rate for transferring data to a recording medium. A host transfer rate of data with respect to a buffer is measured. Provided are a plurality of recording medium transfer rates at which data is transferred between the buffer and the recording medium. A determination is made of an amount of decrease in the host transfer rate. The recording medium transfer rate is selected based on the amount of decrease in the host transfer rate. A transfer rate at which the storage device transfers data is set to the selected recording medium transfer rate.

20 Claims, 7 Drawing Sheets

(56) References Cited

U.S. PATENT DOCUMENTS

| | | | |
|---|---|---|---|
| 2006/0227684 A1 | 10/2006 | Hsu et al. | |
| 2006/0256466 A1 | 11/2006 | Katagiri et al. | |
| 2006/0262691 A1 | 11/2006 | Lenaerts | |
| 2008/0285166 A1 | 11/2008 | Katagiri et al. | |
| 2008/0304174 A1* | 12/2008 | Itagaki et al. | 360/73.01 |
| 2010/0095029 A1 | 4/2010 | Katagiri et al. | |
| 2011/0153727 A1 | 6/2011 | Li | |
| 2012/0290784 A1* | 11/2012 | Katagiri et al. | 711/111 |
| 2013/0097275 A1 | 4/2013 | Smith et al. | |
| 2013/0111080 A1 | 5/2013 | Ohta et al. | |

FOREIGN PATENT DOCUMENTS

| | | |
|---|---|---|
| JP | 2007503078 | 2/2007 |
| JP | 2009289349 | 12/2009 |
| JP | 2010113739 | 5/2010 |
| JP | 2011129117 | 6/2011 |
| WO | 2010004936 | 1/2010 |

OTHER PUBLICATIONS

Rejection received Sep. 24, 2014, pp. 3, for Serial No. JP2011-235707 filed Oct. 27, 2011.
U.S. Pat. No. 8,035,912 is the corresponding English language publication of JP2009289349.
U.S. Pat. No. 8,693,129 is the corresponding English language publication of WO2010004936.
US20060262691 is the corresponding English language publication of JP2007503078.
English translation of JP06202814.
English translation of JP2007503078.
English translation of JP2009289349.
English translation of WO2010004936.
Office Action dated Jul. 17, 2014, pp. 14, for U.S. Appl. No. 13/660,951, filed Oct. 15, 2012.
Response dated Oct. 17, 2014, pp. 10, to Office Action dated Jul. 17, 2014, pp. 14, for U.S. Appl. No. 13/660,951, filed Oct. 15, 2012.
Notice of Allowance dated Jan. 23, 2015, pp. 11, for U.S. Appl. No. 13/660,951, filed Oct. 15, 2012.

* cited by examiner

USING HOST TRANSFER RATES TO SELECT A RECORDING MEDIUM TRANSFER RATE FOR TRANSFERRING DATA TO A RECORDING MEDIUM

CROSS-REFERENCE TO RELATED APPLICATION

This application is a continuation of U.S. patent application Ser. No. 13/660,951, filed Oct. 25, 2012, which application is incorporated herein by reference in its entirety.

CROSS-REFERENCE TO RELATED FOREIGN APPLICATION

This application is a non-provisional application that claims priority benefits under Title 35, United States Code, Section 119(a)-(d) from Japanese Patent Application entitled "STORAGE DEVICE FOR RECORDING DATA SEQUENTIALLY" by Yutaka OISHI and Yumiko OHTA, having Japanese Patent Application Serial No. 2011-235707, filed on Oct. 27, 2011, which Japanese Patent Application is incorporated herein by reference in its entirety.

BACKGROUND

A tape medium is used as a storage device capable of reading/writing large amounts of data sequentially at low cost. It is important for the entire storage system including a tape drive to finish backup and recovery of the large amounts of data within a certain amount of time.

Writing data from a host results in accumulation of data in a buffer memory (also called a buffer) inside a tape drive. When the write speed (drive transfer speed or drive transfer rate) to a tape on the drive side is faster than the data writing speed (host transfer speed or host transfer rate) on the host side, the buffer memory is emptied of data. When the buffer memory gets empty, the tape drive usually performs processing, called a back hitch, for rewinding the recording medium. The back hitch requires a few seconds (3 or 5 seconds). During the back-hitch rewinding operation, the tape drive writes data to the tape medium and no data can be read into the buffer. Since the back hitch operation keeps data transfer from the host waiting, the data transfer rate is affected as a whole. On the other hand, during data reading from the host, the tape drive performs a back hitch when the buffer memory becomes full of data.

SUMMARY

Provided are a storage device, controller, and method for using host transfer rates to select a recording medium transfer rate for transferring data to a recording medium. A host transfer rate of data with respect to a buffer is measured. Provided are a plurality of recording medium transfer rates at which data is transferred between the buffer and the recording medium. A determination is made of an amount of decrease in the host transfer rate. The recording medium transfer rate is selected based on the amount of decrease in the host transfer rate. A transfer rate at which the storage device transfers data is set to the selected recording medium transfer rate

DETAILED DESCRIPTION

Figure 1:
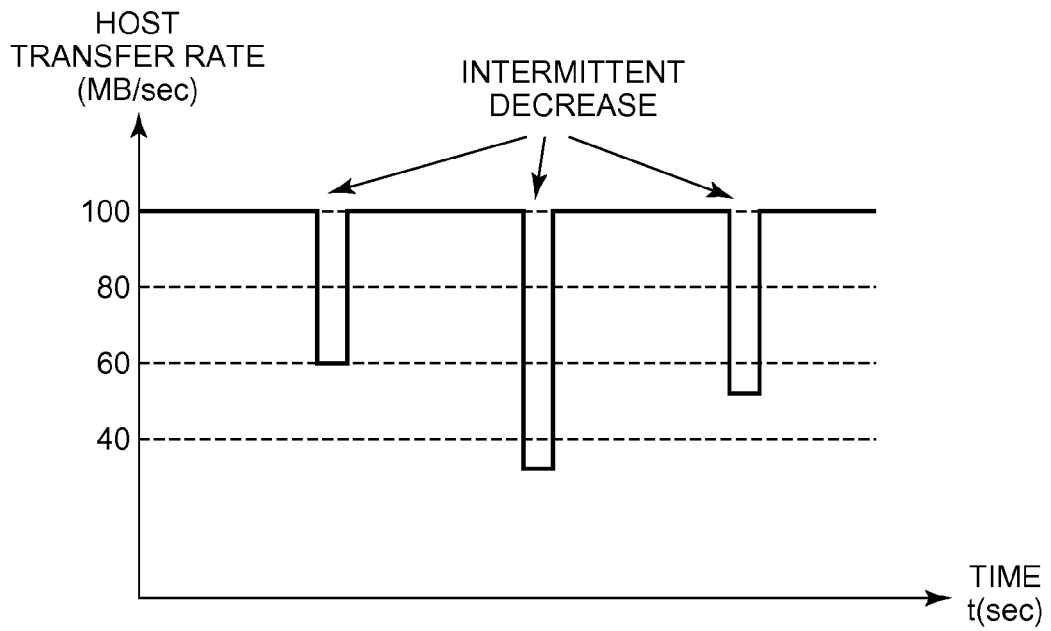
FIG. 1 illustrates a state in which a host transfer rate intermittently decreases.

Described embodiments relate to improving data transfer of a storage device for recording data sequentially. Certain embodiments adjust a data transfer rate on a tape drive side in conjunction with an intermittent decrease in transfer rate on a host side.

In recent years, a tape medium mounted in a tape drive has been gradually used via a file system in the same manner as a removable medium such as a USB memory. IBM Corporation has a linear tape file system (LTFS) as a file system for a tape drive. In a user environment in which the host reads or writes data by using LTFS, the host transfer rate intermittently decreases to cause a back hitch in the tape drive. A long-term adverse effect of this back hitch on the transfer rate on the host side has been reported.

Described embodiments provide a storage device capable of adjusting the drive transfer rate to reduce the effect on the host transfer rate even if a constant host transfer rate intermittently decreases.

One embodiment provides a storage device including: a buffer for temporarily storing data read or written from or to a higher-level apparatus; a recording medium for recording plural pieces of data sequentially; and a controller for controlling reading or writing between the buffer and the recording medium in such a manner that, when a host transfer rate of data to or from the higher-level apparatus intermittently decreases by a second amount of decrease at a first ratio to an average transfer rate, a drive transfer rate of data to or from the recording medium is reduced to a third level.

In certain embodiments the controller includes: a measurement section for measuring multiple host transfer rates for exchanging data with the higher-level apparatus; an adjustment section for adjusting the drive transfer rate for exchanging the data with the recording medium to approximate the drive transfer rate to the host transfer rate; a determination section for determining whether the measured multiple host transfer rates show the second amount of decrease at the first ratio to the average host transfer rate to certify whether the host transfer rate intermittently decreases; and a selection section for selecting a drive transfer rate based on the determination result to decrease the adjusted drive transfer rate to the third level.

In further embodiments, the measurement section measures multiple samples of times of increases or decreases in a fixed data size in the buffer to calculate the host transfer rate.

In a further embodiment, the first ratio of the intermittently decreasing host transfer rate is 10% or less.

In a further embodiment, the first ratio of the intermittently decreasing host transfer rate is 3% or less.

In a further embodiment, the average host transfer rate is calculated based on the remaining measured samples other than those of the first ratio among the multiple measured samples.

In a further embodiment, when the second amount of decrease of the intermittently decreasing host transfer rate is 40% to 60% and the drive transfer rate can be reduced in a step-by-step manner, the adjusted drive transfer rate is decremented by one step.

In a further embodiment, when the second amount of decrease of the intermittently decreasing host transfer rate is 60% or more and the drive transfer rate can be reduced in a step-by-step manner, the drive transfer rate is decremented by two steps.

Certain embodiments control driving of a recording medium to record data sequentially. When a host transfer rate of data to or from a higher-level apparatus intermittently decreases by a second amount of decrease at a first ratio to an average transfer rate, a drive transfer rate of data to or from the recording medium is reduced to a third level, and reading or writing of data between the buffer and the recording medium is controlled.

In a further embodiment, a program causes a computer to control driving of a recording medium to record data sequentially. When a host transfer rate of data to or from a higher-level apparatus intermittently decreases by a second amount of decrease at a first ratio to an average transfer rate, this program causes the computer to perform: reducing a drive transfer rate of data to or from the recording medium to a third level, and controlling reading or writing of data between the buffer and the recording medium.

In certain embodiments, the storage device for recording data sequentially can improve a long-term data transfer rate even if a host transfer rate intermittently decreases.

An embodiment will now be described mainly in a case of writing data from a host to a tape drive. Note that the idea of the following embodiment is also applied to a case where the host reads data from the tape drive.

When an LTFS on a host side uses a tape drive, for example, when many 1 GB files are to be written, data continues to be sent generally at 100 MB/sec. However, due to the operational specificity of the file system, a smaller amount of data, approximately 50 to 100 MB, may be written intermittently at a transfer rate, such as 60 MB/sec, slower than usual. Specifically, the host intermittently transfers a data size less than 10% of the total data size of 1 GB through the LTFS at 60 MB/sec. that is 40% lower than the normal transfer rate of 100 MB/sec. The frequency of intermittent decreases in host transfer rate is independent of the file size to be written. The timing of a decrease in transfer rate on the host side may be unpredictable.

FIG. 1 shows a state in which the host transfer rate intermittently decreases. Decreases in host transfer rates in a short time are referred to as intermittent decreases in host transfer rate. When writing a large amount of data through the file system, the host tries to keep on transferring data at an average host transfer rate consistently. However, it is not always possible to maintain such a uniform host transfer rate. The file system functionally sends a smaller amount of data at an intermittently decreasing transfer rate. The tape drive drives a tape at a drive transfer rate to match the uniform host transfer rate at which most of the data are transferred. The tape drive does not adjust the drive transfer rate on the assumption of an intermittent decrease in host transfer rate. Even though it represents a small percentage of data size, if this intermittent decrease in host transfer rate occurs, the buffer memory is temporarily emptied of data. When the buffer gets empty, the tape drive may cause a back hitch to keep data writing from the host waiting during the operation (3 or 5 seconds).

At an intermittently decreasing transfer rate, just a small data size is written, such as not more than 10% of the total data size and further less than 3%. Thus, even the decrease in transfer rate for such a small data size does not cause a big change in the value of the uniform transfer rate of 100 MB/sec. For example, when the intermittent decrease in host transfer rate, which represents 10% of the total data size, is approximately 60% of the average host transfer rate, the simple average host transfer rate is 90 MB/sec. or more. When there is an intermittent decrease in host transfer rate for 3% of the total data size, the simple average host transfer rate is 97 MB/sec. or more.

Figure 2:
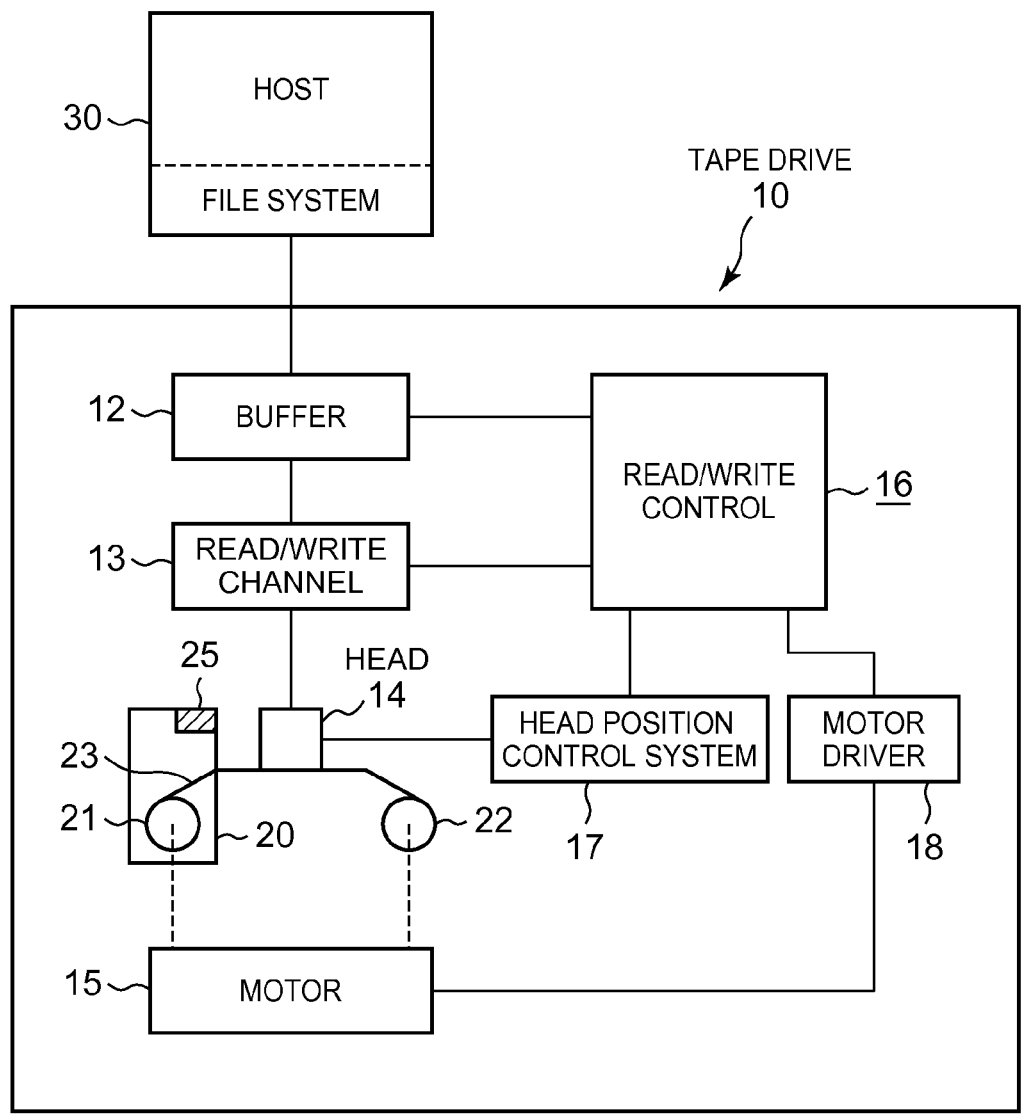
FIG. 2 illustrates an embodiment of a tape drive 10.

FIG. 2 illustrates an embodiment of a tape drive. A tape drive 10 writes and reads multiple pieces of data sent from a host 30 to and from a tape recording medium per fixed-length data set (called DataSet or DS). The host 30 carries out writing to a tape drive through a file system, and sends a read request. When Small Computer System Interface (SCSI) is used as the communication standard, the host 30 issues, to the tape drive 10, a request (Write, Read) for writing/reading data.

The tape drive 10 includes a buffer 12, a read/write channel 13, a head 14, a motor 15, a reel 22 on which a tape 23 is wound, a read/write control 16 (controller), a head position control system 17, and a motor driver 18. Two motors may be provided as the motor 15. The tape drive 10 is removably equipped with a tape cartridge 20.

The tape cartridge 20 includes the tape 23 wound on a reel 21. The tape 23 moves longitudinally from the reel 21 to the reel 22 or from the reel 22 to the reel 21 along with the rotation of the reels 21 and 22. The head 14 writes data to the tape 23 or reads data from the tape 23 along with the longitudinal movement of the tape 23. The motor 15 drives the reels 21 and 22 to rotate. The tape cartridge 20 also includes a non-contact nonvolatile memory called a cartridge memory (CM) 25. The CM 25 equipped in the tape cartridge 20 is read or written by the tape drive 10 in a non-contact manner. The CM 25 holds information (called a tape directory) on tape cartridge attributes. Upon reading and writing, the tape drive takes the attribute information from the CM to enable optimum reading and writing.

The read/write control 16 controls the entire tape drive 10. This control writes data to the tape 23 or reads data from the tape 23 according to a command received from the host 30. The data is written per DS to the tape 23 by the head 14 through the read/write channel 13. This control also controls the head position control system 17 and the motor driver 18 to perform back hitch operation.

The buffer 12 accumulates data to be written to or read from the tape 23. For example, the buffer 12 may be a DRAM. The buffer 12 functions as a ring buffer to process the accumulated data in a FIFO manner. The host transfer rate and the drive transfer rate often disagree. The tape drive uses the buffer to absorb the difference between the host transfer rate and the drive transfer rate. For example, upon writing data, the tape drive once stores, in the buffer, data sent from the host. After that, the tape drive writes the data stored in the buffer to the tape medium. The buffer is divided into areas of about several MB, called segments. Each segment stores DS as the unit of reading or writing data from or to the tape 23.

Figure 3:
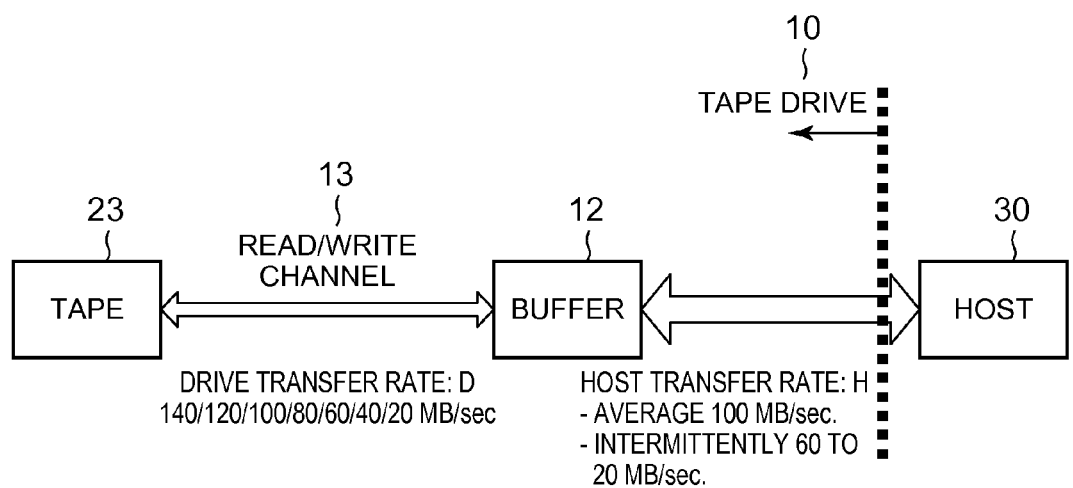
FIG. 3 illustrates a relationship between data transfer rates when the tape drive 10 reads data from a host 30 and receives a write request.

FIG. 3 shows a relationship between data transfer rates when the tape drive 10 reads data from the host 30 and receives a write request, where the host transfer rate and the drive transfer rate are different. The tape drive 10 absorbs this difference in the buffer 12 of about 1 GB to improve the performance of data transfer.

The following describes the relationship between a host transfer rate and a drive transfer rate upon writing data from the host. Upon writing data, the host 30 sends the data at a uniform host transfer rate H (100 MB/sec.). The read/write control 16 of the tape drive 10 sends the data from the buffer 12 to the tape 23 at a drive transfer rate D (140/120/100/80/60/40/20 MB/sec.). The tape drive 30 can select an optimum drive transfer rate from seven-step values to be matched to the host transfer rate (matching). The host transfer rate H is decided by measuring multiple samples of times of constant increased amounts of data size to the buffer 12. The drive transfer rate D is decided by the moving speed of the tape 23 driven by the motor 15. The tape drive is matched to a host transfer rate sampled and measured by the speed matching technique. The tape drive selects a drive transfer rate not less than the host transfer rate and having the slowest level.

Figure 4:
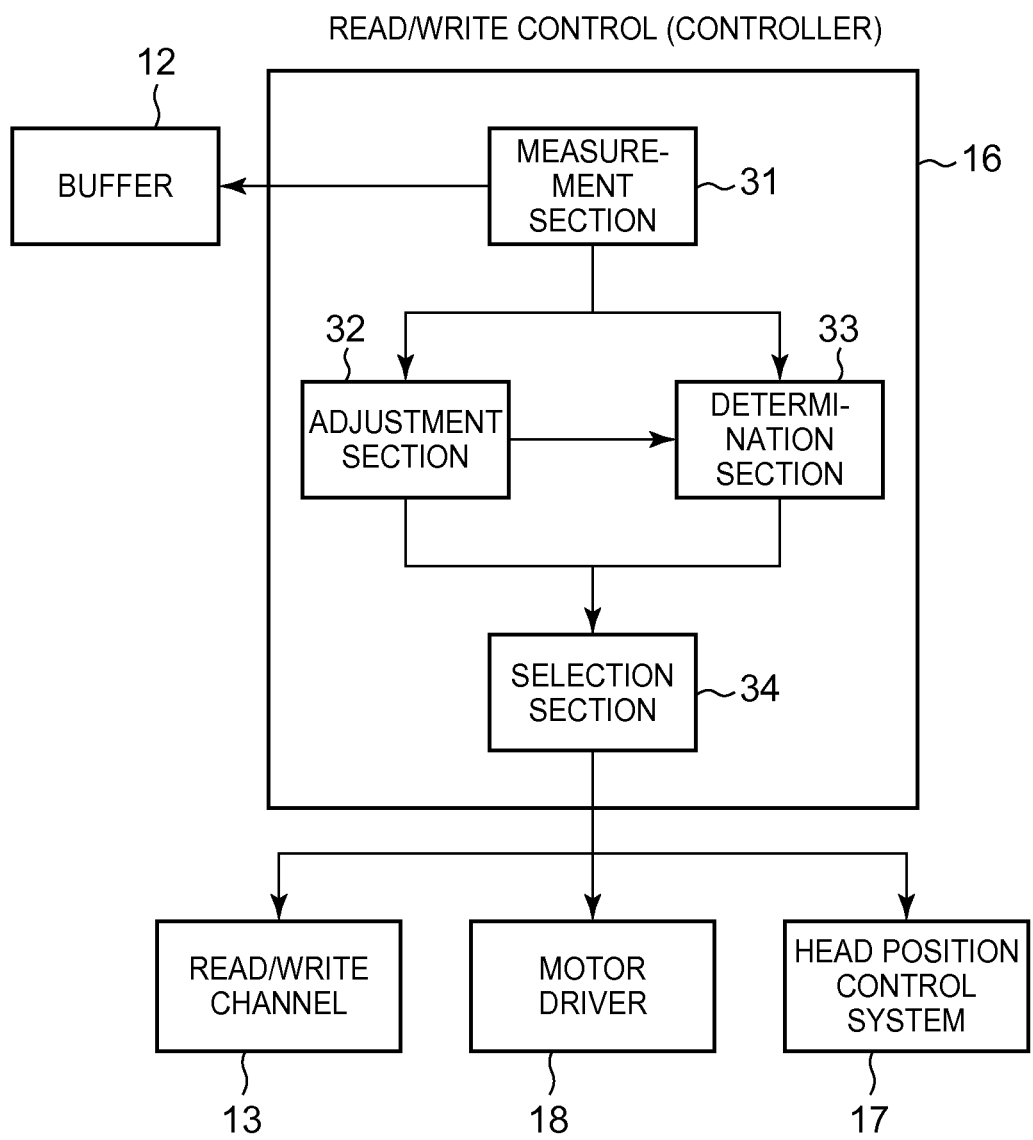
FIG. 4 provides an embodiment of functional blocks of a read/write control.

FIG. 4 shows an embodiment of functional blocks of the read/write control 16. Upon writing, a measurement section 31 calculates a number of samples of host transfer rates from time measurements of constant increased amounts of data in the buffer 12. An adjustment section 32 gives values adjusted to match the drive transfer rate to the measured samples of host transfer rates. A determination section 33 determines whether the measured samples of host transfer rates are intermittent decreased amounts. A selection section 34 selectively determines whether to reduce the rate for the drive transfer rate in the adjustment section 32 based on the determination in the determination section 33. In measuring the samples of host transfer rates, the host transfer rates may be measured from increased or decreased amounts of data in the buffer during a given amount of time. Measuring the host transfer rates is an illustrative example of measuring variations in data size in the buffer. In the case of a read request from the host, if the drive transfer rate is larger than the host transfer rate, the buffer 12 will fill up with data, causing a back hitch. The back hitch requires a given length of time (3 or 5 seconds) because of the need to locate the head 14 in a tape position immediately after data read from the tape 23. Upon reading, the measurement section 31 measures a constant decreased amount of data in the buffer 12 to calculate two or more host transfer rates.

A tape speed selecting algorithm is described below with respect to writing data to the tape medium for ease of explanation. The algorithm is preferably implemented as a function of firmware for the tape drive. This speed selecting algorithm may be contained in the tape library or the like so that the tape drive will get an optimum tape speed from the outside such as the tape library.

The host transfer rates sampled and measured for a constant data size are denoted as H. The tape speed defines the drive transfer rate. In certain embodiments, the optimum value for the tape speed is selected from Dm (m=1, 2, . . . , n) set in a step-by-step manner to be matched to the measured host transfer rate, where m is a speed index indicating that the speed varies in n steps within a range of drive transfer rates, D1 to Dn. Here, D1 is the fastest tape speed, and the tape speed is reduced as the value of m increases.

The amount of decrease t (60% or less) in host transfer rate Hx intermittently decreasing from the average transfer rate Hav of host transfer rates is expressed as t=Hav−Hx. As for 90% or more of all transferred pieces of data, the transfer rate is Hav, i.e., 100 MB/sec. As for host transfer rates of the remaining 10% or less, the intermittently decreasing transfer rates take Hx (≤60 MB/sec.). Described embodiments select a drive transfer rate to correct m adjusted by a matching technique using the speed index m=m(t) as a function of the amount of decrease t. In other words, it is determined based on the value of t whether the index m is to be increased or remain unchanged. The drive D=Dm is selected by the corrected value of m.

The drive transfer rate (tape speed) D=Dm selected by the algorithm may be exemplified by the speed index m as follows:

t<40%, m=unchanged;
60%>t≥40%, m=m+1; and
t≥60%, m=m+2.

In situations when the host transfer rate intermittently varies for an amount smaller than the total data, the time at which data is sent from the host to each segment of the buffer memory is measured and held. Then, samples of time differences are measured by each constant amount of data (e.g., per 100 MB) to calculate a transfer rate on the host side. Among transfer rates calculated from multiple measured samples, a large majority of uniform transfer rates gives an average transfer rate. When a minority of calculated values are a constant value (e.g., 60 MB/sec.) or less with respect to the average value, they are determined to be intermittently decreasing host transfer rates.

The samples of host transfer rates are measured after the tape cartridge 20 is loaded in the tape drive 10. An LTFS is used for the CM housed in the tape cartridge to store information indicating whether there is an intermittent decrease in transfer rate. In an easier way, for example, based on information on the CM housed in the tape cartridge, it may be detected that the LTFS is using the tape medium to determine that the transfer rate varies intermittently. Thus, based on the information on the CM in the cartridge, the tape drive may recognize that this cartridge is used through the LTFS and intermittently decreases. Further, the host itself may use the LTFS to inform the tape drive that it will transfer data so that the tape drive will recognize that there is data transfer intermittently decreased.

Figure 5:
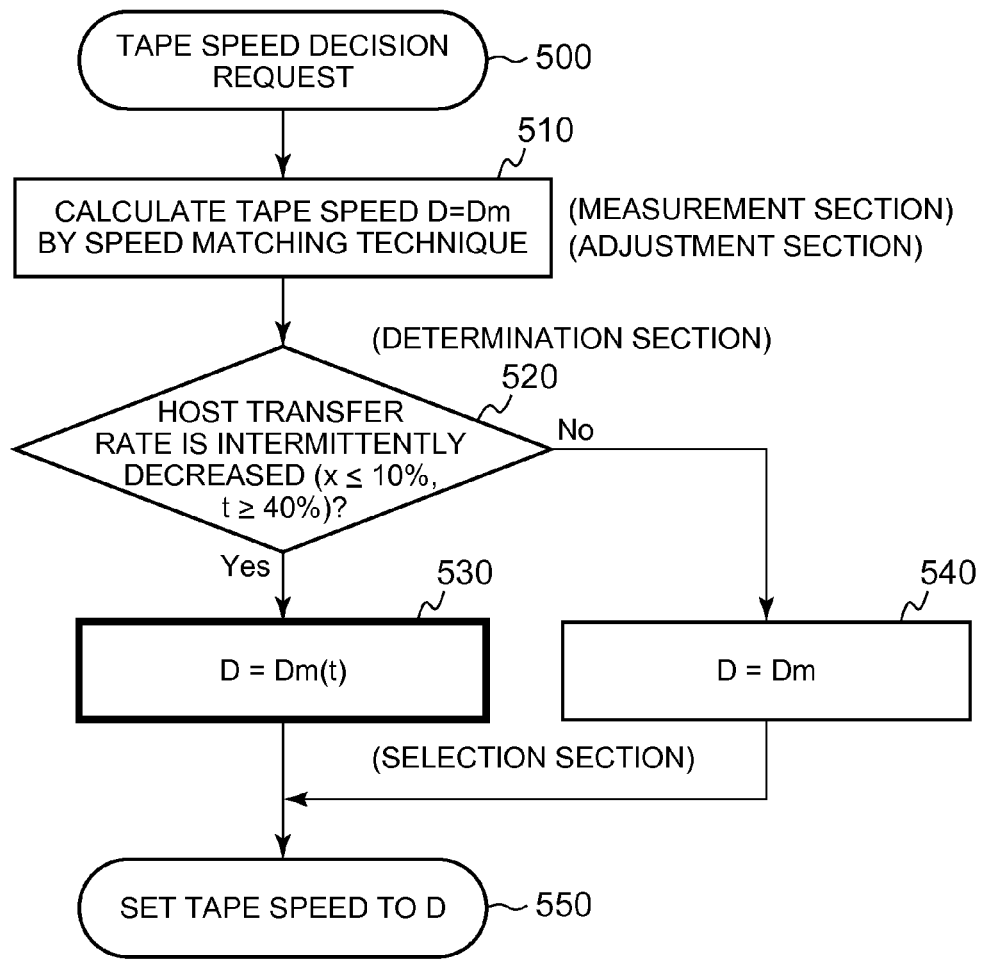
FIG. 5 provides an embodiment of a tape speed selecting algorithm.

FIG. 5 illustrates an embodiment of the tape speed selecting algorithm, described in the context of the functional sections in FIG. 4.

In (510), a tape speed is calculated by a conventional speed matching algorithm. First, a host transfer rate is calculated from a time measurement of an increase in a fixed data size in the buffer (measurement section 31). The time measurement is calculated from a difference obtained by measuring multiple time samples for the fixed data size. The drive transfer rate D=Dm is adjusted based on the measured samples of host transfer rates (adjustment section 32). In other words, a speed index m is decided by the adjustment.

In (520), a determination is made as to whether the intermittence of the host transfer rate is a predetermined intermittent decrease (determination section 33). Here, x (percentage of data size intermittently decreased) is a ratio of data size at an intermittently decreasing transfer rate to data on multiple measured samples. It is checked whether the ratio x of the intermittently decreasing host transfer rate to the data is 10% or less of all the data size samples (x≤10%). Further, it is checked whether the level (Hx) of the intermittent decrease is 40% or more of the average level Hav.

In (530), when the host transfer rate intermittently decreases, the speed index m is increased based on the level t of the intermittent decrease (selection section 34). When an average of measured samples determined to intermittently decrease falls within a range of 40%≤t<60%, the speed index m is incremented by one (m=m+1) to reduce the drive transfer rate by one level. When 60%≤t, the speed index m is incremented by two (m=m+2) to reduce the drive transfer rate by two levels.

In (540), when the host transfer rate does not intermittently decrease, the speed index m adjusted in (510) remains unchanged to select a drive transfer rate (selection section 34).

In (550), a drive transfer rate is set by the speed index m selected in (530) or (540), and the tape drive is driven at the speed.

The drive transfer rate matching technique considers the occurrence of intermittently decreasing host transfer rates (e.g., 60 MB/sec.). The occurrence of intermittently decreasing host transfer rates may comprise 10% or less of the total data size, and 90% of the data may be transferred at a uniform transfer rate (e.g., 100 MB/sec). Also, 0.5 to 3% or less of the total data size may be transferred at intermittently decreasing host transfer rates and the remaining 97% of the data size is transferred at the uniform transfer rate (100 MB/sec.). In such a case, even when all calculated samples of host transfer rates are simply averaged out, 10% or more is never decreased from the average host transfer rate. Even if the drive transfer rate is matched to this host transfer rate, a back hitch caused by an intermittent, abrupt decrease in transfer rate may not be avoided. Even in a limited time aspect of abrupt decrease in host transfer rate up to a level of 40% or more, the buffer gets empty to cause a back hitch in the tape drive. Conventional tape speed matching cannot deal with the case of intermittent host transfer reduced to a given level. When the host transfer is reduced to the given level intermittently and abruptly, the buffer becomes empty and a back hitch is caused, keeping the host waiting during the extra operation. In certain embodiments, the host transfer will not be kept waiting by the back hitch operation even if there is a sacrifice of reduction in drive transfer rate.

An intermittent decrease in host transfer rate is detected to correct the drive transfer rate selected by the matching technique in a step-by-step manner. In one embodiment, the amount of decrease t is zero when the transfer rate shows no intermittent decrease or the amount of decrease t takes a nonzero value when the transfer rate shows an intermittent decrease. For example, the drive transfer rate may be reduced according to the magnitude of the amount of decrease from the average value, i.e., the magnitude of the difference t (t=Hav−Hx). Therefore, in certain embodiments, the drive transfer rate selecting method is applicable even to a case where the drive transfer rate D can be continuously changed. For example, such a value to match the drive transfer rate Dm to the host transfer rate Hav by the matching technique is given. If a function $f(t)$ of a step-by-step transfer level t is given as a correction term to the host transfer rate Hav, the value will be given as $D=D(t)=Dm-f(t)$. If the function $f(t)$ is tuned in consideration of a correlation between the conventional host transfer rate and the fixed tape speed, a further improved effect can be expected.

Figure 6:
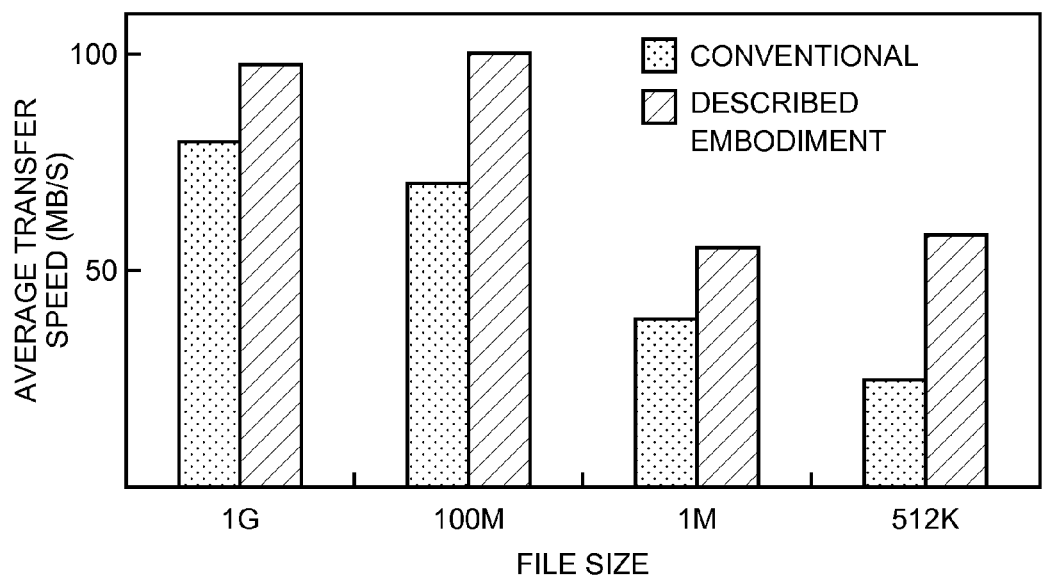
FIG. 6 illustrates a long-term improvement in average transfer speed for drive transfer speeds when the host performs writing through an LTFS.

FIG. 6 shows a long-term improvement in average transfer speed when the selection of a drive transfer speed according to the present invention is made in the case where the host performs writing through the LTFS.

Figure 7:
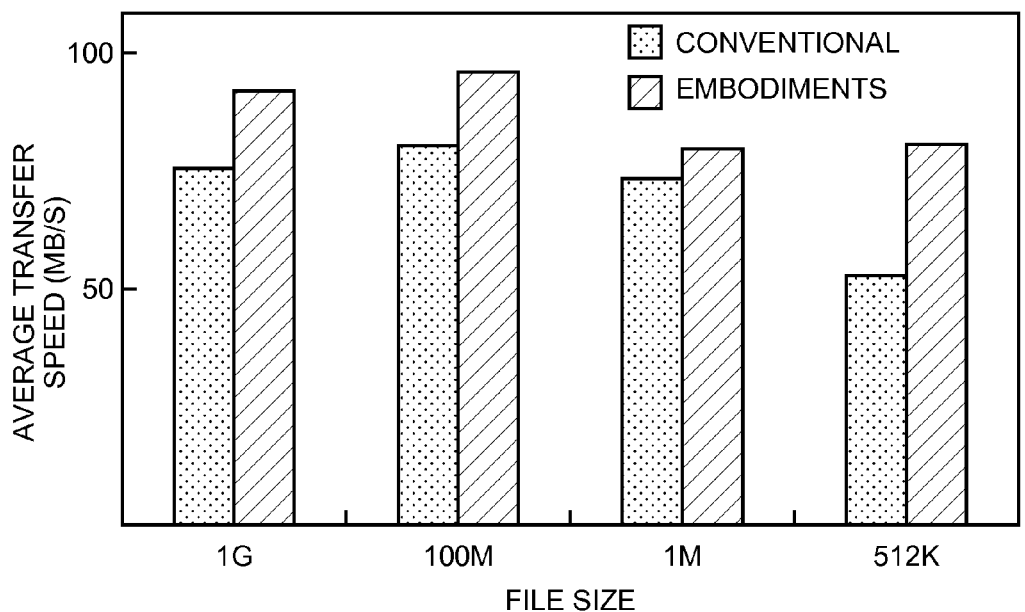
FIG. 7 illustrates a long-term improvement in average transfer speed for drive transfer speeds when the host performs reading through the LTFS.

FIG. 7 shows a long-term improvement in average transfer speed when the selection of a drive transfer speed according to the present invention is made in the case where the host performs reading through the LTFS.

With FIGS. 6 and 7, transfer rates when files having sizes on the abscissa are repeatedly written (FIG. 6) or read (FIG. 7) were measured by using a real machine. Here, the results of the application of the tape speed selecting algorithm of the described embodiments are compared with those of the conventional speed matching method. In selecting a drive transfer rate D=Dm(t), it is assumed that, when the intermittently decreased level t (=Hav−Hx) is a predetermined level or more, the speed index m is incremented by one (m=m+1), or when it is lower than the level, the speed index m remains unchanged. To reduce variations caused by measurement errors, the transfer rate is measured five times in each case, and an average value of the three results after excluding the largest and smallest values is used. In FIG. 6 and FIG. 7, the abscissa represents file sizes and the ordinate represents averages when files in respective sizes are repeatedly written/read. From this experiment, it was confirmed that, regardless of the file size, the host transfer rate was 15 to 25% improved by the application of the present invention in the long term compared with the case of the conventional matching.

While the present invention is described in connection with the embodiment, the scope of the present invention is not limited to the described embodiments. It will be apparent to those skilled in the art that various changes and modifications can be made without departing from the spirit and scope of the present invention.

What is claimed is:

1. A storage device in communication with a host, comprising:
   a buffer for temporarily storing data transferred between the host and the storage device;
   a recording medium to store data;
   a controller for controlling transfer of data between the buffer and the recording medium by performing operations, the operations comprising:
      measuring a host transfer rate of data with respect to the buffer;
      providing a plurality of recording medium transfer rates at which data is transferred between the buffer to the recording medium;
      determining an amount of decrease in the host transfer rate;
      selecting the recording medium transfer rate from the plurality of recording medium transfer rates based on one of a plurality of ranges including the amount of decrease in the host transfer rate; and
      setting a rate in the storage device at which data to the selected recording medium is transferred.

2. The storage device of claim 1, wherein each of the recording medium transfer rates is associated with one of a plurality of index values, wherein the operations further comprise:
   determining one of the index values corresponding to the determined amount of decrease in the host transfer rate, wherein the selected recoding medium transfer rate is associated with the determined index value.

3. The storage device of claim 2, wherein the recording medium transfer rates associated with higher index values have slower transfer rates, wherein each of the index values is associated with a range of decreases in the host transfer rate, and wherein determining the index value comprises determining the index value associated with the range of decreases in the host transfer rate including the determined amount of decrease in the host transfer rate.

4. The storage device of claim 1, wherein the amount of decrease in the host transfer rate is a function of an average host transfer rate and a current measured host transfer rate.

5. The storage device of claim 1, wherein the selecting the recording medium transfer rate comprises:
   if the amount of decrease in the host transfer rate falls within a first range, then select a recording medium transfer rate from the plurality of recording medium transfer rates as a first function of a measured recording medium transfer rate; and if the amount of decrease in the host transfer rate falls within a second range, then selecting a recording medium transfer rate from the plurality of recording medium transfer rates as a second function of the measured recording medium transfer rate.

6. The storage device of claim 1, wherein each of the recording medium transfer rates is associated with one of a plurality of index values, wherein the selecting the recording medium transfer rate comprises:

determining an index value corresponding to a measured recording medium transfer rate;

if the amount of decrease in the host transfer rate falls within a first range, then applying a first function to the determined index value to calculate a first adjusted index value; and if the amount of decrease in the host transfer rate falls within a second range, then applying a second function to the determined index value to produce a second adjusted index value, wherein the selected recording medium transfer rate comprises the recording medium transfer rate associated with the calculated first or second adjusted index value.

7. A controller implementing a program in a storage device coupled to a host, wherein the storage device has a recording medium and a buffer to buffer data transferred between the host and the recording medium, wherein the program is executed to cause the controller to perform operations comprising:

measuring a host transfer rate of data with respect to the buffer;

providing a plurality of recording medium transfer rates at which data is transferred between the buffer and the recording medium;

determining an amount of decrease in the host transfer rate;

selecting the recording medium transfer rate from the plurality of recording medium transfer rates based on one of a plurality of ranges including the amount of decrease in the host transfer rate; and setting a transfer rate in the storage device at which data to the selected recording medium is transferred.

8. The controller of claim 7, wherein each of the recording medium transfer rates is associated with one of a plurality of index values, wherein the operations further comprise:

determining one of the index values corresponding to the determined amount of decrease in the host transfer rate, wherein the selected recoding medium transfer rate is associated with the determined index value.

9. The controller of claim 8, wherein the recording medium transfer rates associated with higher index values have slower transfer rates, wherein each of the index values is associated with a range of decreases in the host transfer rate, and wherein the determining the index value comprises determining the index value associated with the range of decreases in the host transfer rate including the determined amount of decrease in the host transfer rate.

10. The controller of claim 7, wherein the amount of decrease in the host transfer rate is a function of an average host transfer rate and a current measured host transfer rate.

11. The controller of to claim 7, wherein the controller includes:

a measurement section for measuring a plurality of host transfer rates for exchanging data with a higher-level apparatus;

an adjustment section for adjusting the recording medium transfer rate for exchanging the data with the recording medium to approximate the recording medium transfer rate to the host transfer rate;

a determination section for determining whether measured host transfer rates have a decrease with respect to an average host transfer rate to indicate that the host transfer rate is intermittently decreasing; and a selection section for selecting a drive transfer rate based on the determination whether the host transfer rate is intermittently decreasing to reduce the drive transfer rate.

12. The controller of claim 11, wherein the measurement section measures a plurality of samples of times of increases or decreases in a fixed data size in the buffer to calculate the host transfer rate.

13. The controller of to claim 7, wherein the selecting the recording medium transfer rate comprises:

if the amount of decrease in the host transfer rate falls within a first range, then select a recording medium transfer rate from the plurality of recording medium transfer rates as a first function of a measured recording medium transfer rate; and if the amount of decrease in the host transfer rate falls within a second range, then selecting a recording medium transfer rate from the plurality of recording medium transfer rates as a second function of the measured recording medium transfer rate.

14. The controller of to claim 7, wherein each of the recording medium transfer rates is associated with one of a plurality of index values, wherein the wherein the selecting the recording medium transfer rate comprises:

determining an index value corresponding to a measured recording medium transfer rate;

if the decrease in the host transfer rate falls within a first range, then applying a first function to the determined index value to calculate a first adjusted index value; and if the decrease in the host transfer rate falls within a second range, then applying a second function to the determined index value to produce a second adjusted index value, wherein the selected recording medium transfer rate comprises the recording medium transfer rate associated with the calculated first or second adjusted index value.

15. A method, comprising:

measuring a host transfer rate of data with respect to a buffer in a storage device that buffer data transferred between a recording medium and a host;

providing a plurality of recording medium transfer rates at which data is transferred between the buffer to the recording medium;

determining an amount of decrease in the host transfer rate;

selecting the recording medium transfer rate from the plurality of recording medium transfer rates based on one of a plurality of ranges including the amount of decrease in the host transfer rate; and setting a transfer rate in the storage device at which data to the selected recording medium is transferred.

16. The method of claim 15, wherein each of the recording medium transfer rates is associated with one of a plurality of index values, further comprising:

determining one of the index values corresponding to the determined amount of decrease in the host transfer rate, wherein the selected recoding medium transfer rate is associated with the determined index value.

17. The method of claim 16, wherein the recording medium transfer rates associated with higher index values have slower transfer rates, wherein each of the index values is associated with a range of decreases in the host transfer rate, and wherein the determining the index value comprises determining the index value associated with the range of decreases in the host transfer rate including the determined amount of decrease in the host transfer rate.

18. The method of claim 15, wherein the amount of decrease in the host transfer rate is a function of an average host transfer rate and a current measured host transfer rate.

19. The method of claim 15, wherein the selecting the recording medium transfer rate comprises:

if the decrease in the host transfer rate falls within a first range, then select a recording medium transfer rate from the plurality of recording medium transfer rates as a first function of a measured recording medium transfer rate; and if the decrease in the host transfer rate falls within a second range, then selecting a recording medium transfer rate from the plurality of recording medium transfer as a second function of the measured recording medium transfer rate.

20. The method of claim 15, wherein each of the recording medium transfer rates is associated with one of a plurality of index values, wherein the wherein the selecting the recording medium transfer rate comprises:

determining an index value corresponding to a measured recording medium transfer rate;

if the decrease in the host transfer rate falls within a first range, then applying a first function to the determined index value to calculate a first adjusted index value; and if the decrease in the host transfer rate falls within a second range, then applying a second function to the determined index value to produce a second adjusted index value, wherein the selected recording medium transfer rate comprises the recording medium transfer rate associated with the calculated first or second adjusted index value.

* * * * *